United States Patent [19]

Jackson

[11] Patent Number: 4,674,570

[45] Date of Patent: Jun. 23, 1987

[54] BORE HOLE PLUG

[75] Inventor: Jim Jackson, Carvel, Canada

[73] Assignee: J.J. Seismic Flowing Hole Control (C.I.) Inc., Carvel, Canada

[21] Appl. No.: 803,020

[22] Filed: Nov. 25, 1985

Related U.S. Application Data

[63] Continuation-in-part of Ser. No. 661,227, Oct. 15, 1984, Pat. No. 4,633,946.

[51] Int. Cl.⁴ .......................................... E21B 33/127
[52] U.S. Cl. .................................... 166/187; 166/295
[58] Field of Search ............... 166/187, 63, 192, 294, 166/295, 285, 292, 300, 309; 277/34.6, 34

[56] References Cited

U.S. PATENT DOCUMENTS

| | | | |
|---|---|---|---|
| 2,321,761 | 6/1943 | Mathis et al. | 166/295 |
| 3,379,253 | 4/1968 | Chism | 166/295 |
| 3,613,784 | 10/1971 | Bassani | 166/187 |
| 3,726,340 | 4/1973 | Fraser | 166/295 |
| 3,878,686 | 4/1975 | Hageman et al. | 166/295 |
| 4,321,967 | 3/1982 | Koppe et al. | 166/295 |
| 4,449,584 | 5/1984 | Christensen | 166/187 |

Primary Examiner—Stephen J. Novosad
Assistant Examiner—Thuy M. Bill
Attorney, Agent, or Firm—Irvin A. Lavine

[57] ABSTRACT

There is provided a new and useful bore hole plug comprising a central support member, an expandable sleeve secured about the central support, a first reactant chemical within the sleeve which is capable of reacting with a second reactant chemical or a catalyst to form a closed cell foam, and means by which the second reactant can be introduced to the sleeve.

26 Claims, 4 Drawing Figures

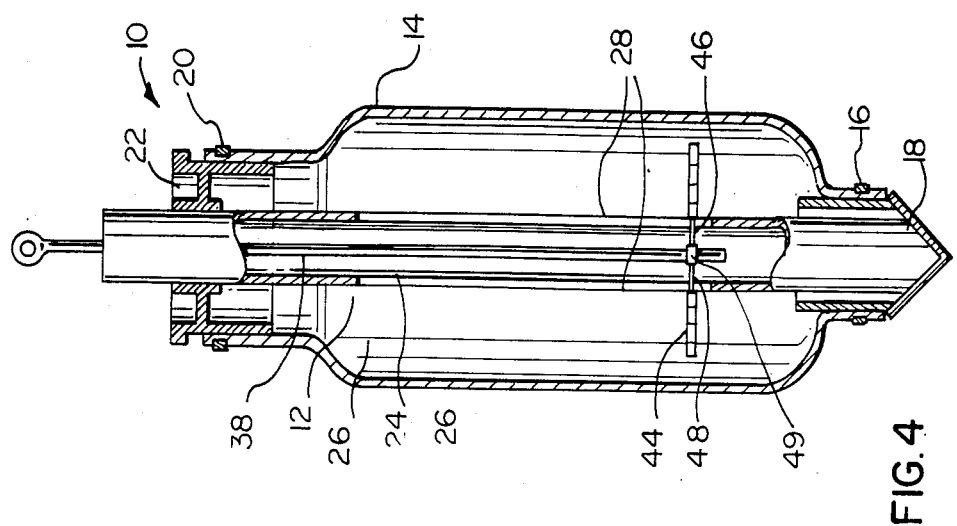
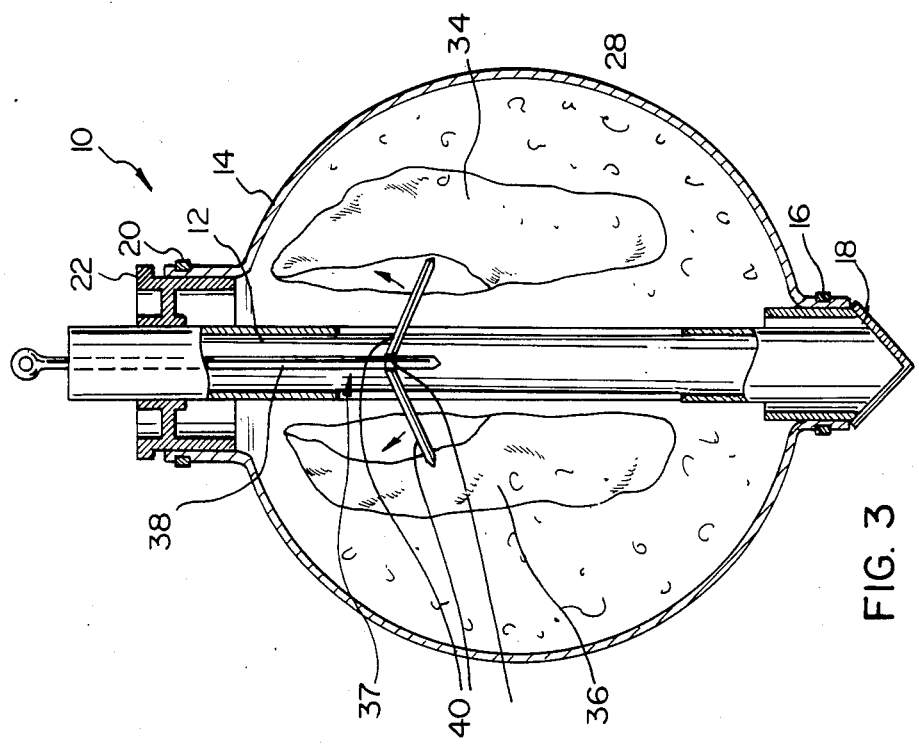

BORE HOLE PLUG

This is a continuation-in-part of application Ser. No. 661,227 filed Oct. 15, 1984, now U.S. Pat. No. 4,633,946.

BACKGROUND OF THE INVENTION

In carrying out a seismic exploration, a standard procedure is to drill holes into the geologic formations of interest and to plant explosive charges in the bore holes. The charges are then detonated and appropriate measurements recorded to enable evaluation of the formation.

There are a number of problems associated with this seismic drilling. One of these occurs during the actual blast. Unless the hole is properly plugged prior to detonation, a large proportion of the energy of the blast escapes upwardly through the hole and is thus not properly directed through the formation of interest.

A second problem which frequently arises is that the boring and blast releases from the formation water under pressure which then escapes through the hole. A bore hole plug is necessary to stop the water flow.

There is therefore a continuing need for a bore hole plug which is simple and inexpensive in construction yet sufficiently durable to remain in place for extended periods and to withstand the force of the blast and of the water. To date, a variety of plugs have been proposed and used, but these do not satisfactorily meet all of the criteria set out above.

The bore hole plug of the present invention is intended to alleviate the problems discussed.

PRIOR ART

There are a number of United States and Canadian patents which fall into the general area of interest but which are deficient in one or other aspects. Among U.S. patents of interest is U.S. Pat. No. 2,609,880, issued Sept. 9, 1952 to one Dyer. In this case the container is partitioned to contain two reactants such as water and cement. The object, however, is to plug a fracture or the like at the side of the bore hole, and the device would not be suitable nor is it intended to seal the bore hole itself. In particular, the container is destroyed or removed from the hole in bringing the two reactants together, and it is therefore not apparent that any seal at all would be formed in the bore hole itself.

U.S. Pat. No. 2,966,946, issued Jan. 3, 1961 to McCulloch, et al., provides a rather complex device one aspect of which is an air inflatable sleeve. Compressed air is provided from a cylinder that is held within the plug. Inherent in this device are the disadvantages of all of the air inflated types, namely, that there is a tendency over the long term for leakage and deflation and, as well, there is a real danger of rupture. Clearly, rupture of the sleeve is disastrous in an air inflated device.

U.S. Pat. No. 3,130,787, issued Apr. 28, 1960 to Mason, is a relatively simple inflatable bag type plug. In addition to the disadvantages generally inherent in air inflatables, this device has in addition the disadvantage that is is inflated via compressor and piping from the surface and therefore adds this complexity and expense.

Canadian Pat. No. 703,786, issued Feb. 16, 1965, to Smith provides another air expandable plug. This device has a number of disadvantages similar to those of the Mason patent.

Canadian Pat. Nos. 840,218, issued Apr. 28, 1970 and 889,694 issued Jan. 4, 1972, both to Bassani, provide yet another air inflatable where the air for inflation is provided from the surface.

Canadian Pat. Nos. 921,399, issued Feb. 20, 1973 and 951,241, issued July 16, 1974 both to Schlumburger Canada Limited, are typical of a large group of prior art patents which pertain to complex plug arrangements, designed with a flow through bridge which can eventually be blocked to provide a complete plug. In general the complexity of these devices adds greatly to the expense and renders them undesirable for use in seismic drilling.

Finally, Canadian Pat. No. 1,117,865, issued Feb. 9, 1982, to Ditto, provides another air inflated plug wherein the gas cylinder providing the compressed air is located in the plug. The air release is by way of an electrically operated valve which is in turn connected to the surface and to a source of electric current by a pair of lead wires. Again, this device has the disadvantage of the air inflatables with surface connection.

In contrast, the plug of the present invention utilizes an inflatable sleeve and reactants which are brought into contact to form an expanding settable foam which sets in the bore hole to form an effective and uniform seal. The effectiveness of the seal is thus not affected by leakage nor by rupture of the sleeve.

SUMMARY OF THE INVENTION

The invention utilizes an inflatable bag or sleeve to effect a uniform and permanent plug in a bore hole. At least one source of reactant is located within the sleeve and means is provided for effecting contact between the first reactant and a second reactant or a catalyst, the source of which may or may not be located within the sleeve. The reactants are chosen such that, upon contact, they react to expand into a settable foam. The foam sets in the hole to form an extremently hard and durable plug.

Accordingly, the invention provides a bore hole plug comprising a central support member, an expandable sleeve secured about the central support, a first reactant chemical within said sleeve which is capable of reacting with a second reactant chemical to form a closed cell foam; and means by which the second reactant can be introduced to the sleeve.

In a further embodiment the invention provides a bore hole plug comprising a central support member, and expandable sleeve secured about the central support, at least two discrete sources of reactant chemicals within the sleeve, each of which provides a chemical, the chemicals being such that they react upon contact with each other to expand into a settable foam, and means associated with the central support member for effecting contact between the reactants.

In a further embodiment the invention provides a bore hole plug comprising a central hollow cylindrical support member having a pair of slots through the side wall thereof and having top and bottom end closures, an expandable sleeve member secured about the support member and encompassing the slots, a pair of fracturable containers within the sleeve and disposed adjacent the slots, each containing a reactant chemical, the chemicals chosen such that they react upon contact with each other to expand into a settable foam, a pair of arms pivotally mounted in the central member and adapted to rotate from a first position within the member to a second position extending through respective ones of the slots, and a control rod extending through and slidable relative to the top closure for effecting rotation of the arms, whereby rotation of the arms from the first to the second position causes the arms to fracture the containers to thereby effect contact between the reactants.

BRIEF DESCRIPTION OF THE DRAWINGS

In drawings which illustrate embodiments of the invention,

FIG. 3 is a view similar to FIG. 2 where the plug has been inflated;

FIG. 4 is a side elevation partly in section illustrating a further embodiment of the invention.

Figure 2:
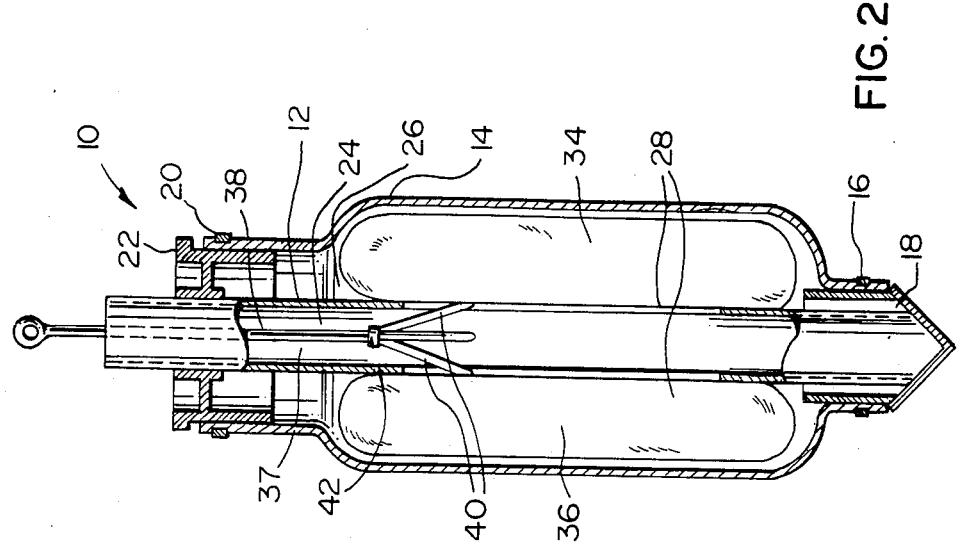
FIG. 2 is a side elevation partly in section illustrating a further embodiment of the invention.

While the invention will be described in conjunction with the illustrated embodiments, it will be understood that is is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 1:
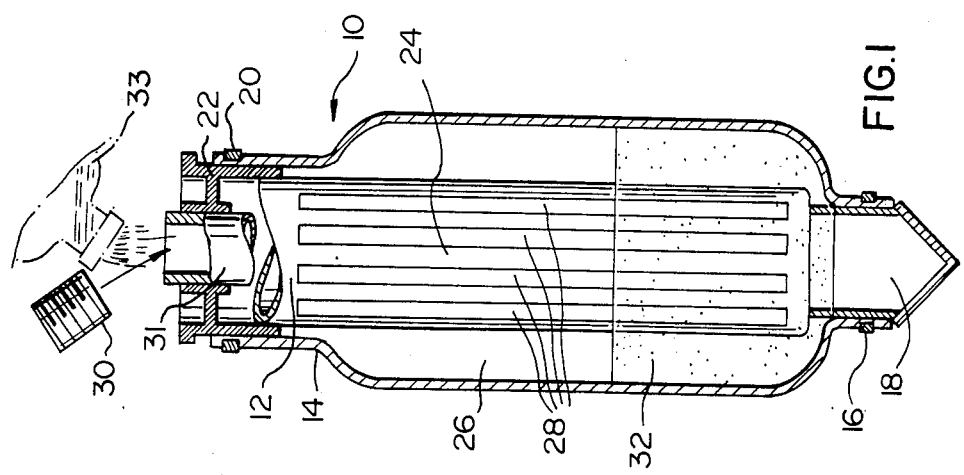
FIG. 1 is a side elevation partly in section of a plug according to the invention.

With reference to FIG. 1, plug 10 comprises the central support member 12 about which is secured the inflatable sleeve 14. Sleeve 14 is secured by means of clamp 16 to the lower end cap or collar 18 and by means of clamp 20 to the upper end collar 22. End cap 18 and collar 22 are secured to the central support member 12. End cap 18 is preferably cone-shaped at the lower end to facilitate entry and travel of the plug in the bore hole.

The member 12 is preferably a length of PVC plastic pipe, and the end caap 18 and the collar 22 are preferably of ABS plastic. Typically the plug will have an overall length in the area of eighteen inches. The diameter of uninflated sleeve 14 and of end cap 18 and collar 22 are such as to provide sufficient clearance for insertion of the plug into a bore hole.

The sleeve 14 is an expandable elastic material such as rubber.

The member 12 is provided with at least one opening for communication between the interior 24 of the member 12 and the interior 26 of the sleeve 14. In FIG. 1 four such openings comprising elongated slots 28 are illustrated.

Also in FIG. 1 the tubular member 12 is provided with a closure 30 comprising, as illustrated, a threaded plug. In the case illustrated the plug is actually inserted into a tube 31 leading to tube 12. However, plug 30 could as well be attached directly to collar 22. Any similar removeable closure 30 to seal the member 12 would be suitable and, in particular, once in place in a use situation, it is not contemplated that the closure 30 would normally be removed. Therefore, it is generally only necessary that the closure 30 seal and hold adequately against the expanding foam, so a quick setting cement, a clamp, or the like may be found suitable in some situations.

The plug 10 includes, in the most general configuration, illustrated in FIG. 1, a first chemical reactant 32 located in the sleeve 14. This reactant is one which, upon contact with a second reactant or a catalyst 33, reacts and expands to form a closed cell foam. In a preferred embodiment the foam may be polyurethane or urea based, and the reactants or reactant and catalyst to produce the foam in situ are available commercially. For example, a suitable polyurethane based polymer comprises as reactants 32 and 33 a polyol and an isocyanate. One such reactant pair is produced by Denys N.V. of Belgium under product designation JJ FOAM 360W and distributed in Canada by Denca Construction Specialties Inc. of Edmonton.

A suitable urea based polymer comprises as reactant 32 and catalyst 33 respectively a polyurea polyalkylene oxide and an amine catalyst. One such polymer is available from the above supplier under the product designation DECI 16 (Deci is a registered trademark); and one such catalyst is available under the product designation DECICAT 16.

In use the closure 30 is removed, the catalyst 33 added to the tubular member 2, and the closure 30 replaced.

The whole container is then agitated, as by hand shaking, to promote movement of the first reactant and the catalyst between the tubular member 12 and the sleeve 14 to promote good contact. The plug is then simply dropped into the bore hole where the reaction goes to completion, expanding the sleeve 14 tightly against the bore hole walls to effect the seal.

Clearly, in seismic blasting, the explosive charge will have been set in the bore hole prior to insertion of the plug.

In the flow control case, it may be necessary to hold the plug at the proper depth in the hole until the foam has set. This can be done by utilizing rods extending from the surface down into the borehole to threadedly engage the end collar 22 in place of plug 30. The rods can then be removed when the foam has set.

In a modification of this embodiment, the catalyst or second reactant 33 may be located in a fracturable container in the tube 12. Prior to use the plug 30 is removed and a suitable prod inserted to tear or break the fracturable container. The prod is then removed, plug 30 reinserted, and the plug 10 shaken. The plug 10 is then inserted into the hole prior to the foam setting. As with the first embodiment discussed above, in the case of a flowing hole, the closure 30 can be repalced by a connection to the surface to position the plug 10 until setting is complete.

A second embodiment of the invention is illustrated in FIG. 2. In that embodiment the plug as an operating unit is completely self-contained in that both the first and second reactants are located within the sleeve 14.

Preferably, the reactants are located in a pair of containers 34 and 36 in proximity to central member 12. The chemicals as above are chosen to react upon contact to expand into a settable foam. The foam is chosen to be of a type that will set into a very hard material.

In order to effect contact between the chemicals in containers 34 and 36, the mechanism 37 is provided for breaking or puncturing the containers. Clearly, the containers 34 and 36 are comprised of a material which can readily be punctured. In the preferred case the means for effecting rupture of the containers comprises a plunger arm 38 with which is threadedly engaged a set of arms 40 on a pivotting mechanism 42. The arms are preferably spring biased toward the closed position illustrated in FIG. 2.

Prior to use of the plug, the wings 30 are maintained in the closed position illustrated in FIG. 1 by virture of abuttment against the inner walls of the member 12 or by the spring bias. To effect rupture of the containers 34 and 36 and subsequent contact of the chemicals contained in the containers, the plunger 38 is moved downwardly in the member 12 to a position where the wings 40 can extend outwardly through slots 28 provided for the purpose in the member 12. A camming mechanism is provided in the connection 42 to extend the arms 40 when plunger 28 is depressed. The containers 34 and 36 are preferably positioned adjacent the slots, so that when the wings 40 move into the open position, the containers 34 and 36 will be ruptured and the chemicals will be released to contact each other and begin the foaming reaction.

The plunger 38 is removed from the mechanism 42 (by disengaging the threads) and an end closure such as plug 30 of FIG. 1 is inserted.

The chemicals can be chosen to react at a sufficiently slow rate that the plunger can be activeated at the surface to begin the foaming reaction and the plug subsequently dropped into the bore hole. In this situation, it is unnecessary that there by any connection at all as between the plug and the surface of the earth. As with the earlier cases, however, a surface connection may be utilized in cases where the plug must be positioned and held until the foam is set in a flowing hole.

The chemicals are chosen to produce a foam which will expand sufficiently to force the sleeve 14 to expand against the walls of the bore hole to form a tight seal. The foam will set to a very hard and durable mass. Such foams are readily available from manufacturers.

In an alternative embodiment, the wings 40 are spring biased to the open position of FIG. 3, so that they assume the open position when the plunger 38 is depressed to the point where wings 40 reach the upper ends of slots 28. Continued depression of the plunger with the arms 40 extended further aids in rupture of containers 34 and 36 and in subsequent mixing of the two reactants.

The embodiment illustrated in FIG. 4 enhances the effectiveness of the invention. While it is applicable to either of the FIG. 1 or 2 embodiments, it is particularly useful with the FIG. 1 situation.

Here the plunger 38 is fitted with a mixing device 44 which may take a variety of forms but is preferably a perforated or webbed ring. The ring 44 is joined to the plunger 38 by the rods 46 and 48 which extend through the slots 28 in the tubular member 12 to the threaded collar 49.

In operation, and based on the FIG. 1 embodiment, the second reactant or catalyst would be added to the tubular member 12 and the plunger 38 would be moved up and down in the member 12 thereby enhancing mixing between the reactants. This may be further enchanced by agitation of the plug as a whole.

The plunger is then preferably removed by unscrewing from threaded collar 49.

Thus it is apparent that there has been provided in accordance with the invention a bore hole plug that fully satisfies the objects, aims and advantages set forth above. While the invention has been described in conjunction with specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. A bore hole plug comprising:
   a tubular central support member having a top and bottom end and closed at the bottom end;
   a collar secured around each end of said member;
   an expandable sleeve having top and bottom ends secured respectively to said collars;
   at least one opening for communication between the interior of said tubular member and the sleeve;
   a removable closure threadedly secured in the top of said tubular member;
   a first reactant chemical within said sleeve which is capable of reacting with a second reactant chemical or a catalyst to form a closed cell foam;
   a said second reactant chemical or catalyst contained in a rupturable container located in said central support member, and
   said plug comprising means for rupturing said container.

2. The plug of claim 1 wherein said central support member contains a series of elongated slots for communication between the interior of said support member and the interior of said sleeve.

3. The plug of claim 1 wherein said foam is polyurethane or urea based.

4. The plug of claim 1 wherein the first and second reactant chemicals are respectively a polyol and an isocyanate.

5. The plug of claim 1 wherein the first reactant is a polyurea polyalkylene oxide and the catalyst is an amine.

6. A bore hole plug comprising:
   a central support member;
   an expandable sleeve secured about said central support;
   at least two discrete sources of reactant chemicals within said sleeve, said chemicals being such that they react upon contact with each other to expand into a settable foam; and
   means associated with said central support member for effecting contact between said reactants.

7. The plug of claim 6 wherein the said support is an elongated member sealed at the ends thereof.

8. The plug of claim 7 wherein the said central member is a hollow cylinder including top and bottom closures.

9. The plug of claim 8 wherein the said central member includes end collars at each end thereof and wherein said sleeve is clamped in place around said collars.

10. The plug of claim 6 wherein said sources of reactant chemicals comprise a pair of breakable or punctureable containers.

11. The plug of claim 8 wherein said sources of reactant chemicals comprise at least one breakable or punctureable container.

12. The plug of claim 11 wherein the said sources comprise a pair of said containers.

13. The plug of claim 12 wherein the containers are located adjacent said central member.

14. The plug of claim 13 wherein the containers are located on opposite sides of said central member.

15. The plug of claim 11 wherein said top closure is removeable; wherein the said central member includes at least one slot through the side wall thereof; and wherein said means associated comprises at least one arm pivotally mounted in said central member, and adapted to rotate from a first position within said central member to a second position extended through said slot, and a control means extending out of the top of said central member for effecting rotation of at least one arm; whereby rotation of said at least one arm from said first to said second postion causes said arm to fracture said at least one container to thereby effect contact between said reactants.

16. The plug of claim 11 wherein said top closure is removeable; wherein the said central member includes at least one slot through the side wall thereof; and wherein said means associated comprises a plunger extending out of the top of said central member and moveable longitudinally relative thereto from a first upper to a second lower position, and at least one arm pivotally attached to said plunger and moveable and spring biased from a closed toward an open position, and wherein the said arm is so located relative to said at least one slot that whent he said plunger is in said upper position, said at least one arm abuts against the inner surface of said central support member and when said plunger is moved to said lower position, said arm assumes said open position by rotation through said slot.

17. The plug of claim 14 wherein said central member includes a slot therein adjacent each said container; and wherein said means associated comprises a pair of arms pivotally mounted in said central member and adapted to rotate from a first position within said central member to a second position extending through respective ones of said slots, and a control means extending out of the top of said central member for effecting rotation of said arms; whereby rotation of said arms from said first to said second position causes said arms to fracture said containers to thereby effect contact between said reactants.

18. The plug of claims 15 or 16 wherein said control means comprises a rod slidable relative to said central member.

19. The plug of claim 6 wherein said foam is polyurethane or urea based.

20. The plug of claim 6 wherein the first and second reactant chemicals are respectively a polyol and an isocyanate.

21. A bore hole plug comprising:

a central hollow cylindrical support member having a pair of slots through the side wall thereof and having a bottom end closure;
a top end closure adapted to be secured in the top end of said central member;
an expandable sleeve member secured about said support member and encompassing said slots;
a pair of fracturable containers within said sleeve and disposed adjacent said slots, each containing a reactant chemical or a catalyst, the chemicals chosen such that they react upon contact with each other to expand into a settable foam;
a pair of arms pivotally mounted in said central member and adapted to rotate from a first positon within said member to a second position extending through respective ones of said slots; and
a control rod extending through and slidable relative to the top of said central member for effecting rotation of said arms;
whereby rotation of said arms from said first to said second position causes said arms to fracture said containers to thereby effect contact between said reactants.

22. The plug of claim 14 wherein said central member include at least two longitudinally extending slots and wherein the plug includes a rod extending longitudinally through and slidable relative to the top end of said tubular member into the interior thereof, an annular ring between said tubular member and said sleeve, and connecting members extending through said slots to secure said ring to said rod, whereby longitudinal movement of said rod will cause said ring to move correspondingly in the space between said tubular member and said sleeve to rupture said containers and mix said reactant chemicals.

23. The plug of claim 22 wherein the said connecting members are joined to a collar and wherein the said rod threadedly engages the said collar.

24. The plug of claim 21 wherein said foam is polyurethane or urea based.

25. The plug of claim 21 wherein the first and second reactant chemicals are respectively a polyol and an isocyanate.

26. The plug of claim 21 wherein the first reactant is a polyurea polyalkylene oxide and the catalyst is an amine.

* * * * *